(12) United States Patent
Seitz et al.

(10) Patent No.: US 7,559,250 B2
(45) Date of Patent: Jul. 14, 2009

(54) FRAME CRACK DETECTION METHOD

(75) Inventors: Kris Edward Seitz, Bethany, IL (US); Troy Allen Shawgo, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/905,044

(22) Filed: Sep. 27, 2007

(65) Prior Publication Data
US 2009/0084188 A1    Apr. 2, 2009

(51) Int. Cl.
*G01N 19/08* (2006.01)

(52) U.S. Cl. .......................... 73/799; 73/760
(58) Field of Classification Search ............ 73/760–860
See application file for complete search history.

(56) References Cited

U.S. PATENT DOCUMENTS

| | | | |
|---|---|---|---|
| 774,874 A | 11/1904 | Gesner et al. | |
| 2,663,271 A | 12/1953 | Becker | |
| 3,269,186 A | 8/1966 | Hebenstreit | |
| 3,739,376 A | 6/1973 | Keledy | |
| 3,795,147 A | 3/1974 | Peterson et al. | |
| 3,803,485 A * | 4/1974 | Crites et al. | 324/693 |
| 3,820,381 A | 6/1974 | Thurston | |
| 3,985,318 A | 10/1976 | Dominey et al. | |
| 4,104,906 A * | 8/1978 | Oertle | 73/104 |
| 4,135,386 A * | 1/1979 | Peterson et al. | 73/40 |
| 4,145,915 A * | 3/1979 | Oertle et al. | 73/37 |
| 4,254,415 A | 3/1981 | Kaufman | |
| 4,389,877 A | 6/1983 | Lacey | |
| 4,448,080 A | 5/1984 | Dressel et al. | |
| 4,721,413 A | 1/1988 | Crohas et al. | |
| 5,369,675 A * | 11/1994 | Diaz et al. | 376/249 |
| 5,770,794 A | 6/1998 | Davey | |
| 6,840,083 B2 * | 1/2005 | Hijikata | 73/12.01 |
| 2002/0029614 A1 | 3/2002 | Davey | |

* cited by examiner

*Primary Examiner*—Max Noori
(74) *Attorney, Agent, or Firm*—Finnegan, Henderson, Farabow, Garrett & Dunner

(57) ABSTRACT

A method for detecting a crack in a frame is disclosed. The method includes sensing with a first pressure sensor a first pressure within a first sealed cavity. The first sealed cavity is interior to a first structure of the frame. Additionally, the method includes detecting a first change in the sensed first pressure. The method also includes determining preliminarily that a crack has formed in the first structure based on the detected change in the sensed first pressure. In addition, the method includes determining a criticality of the crack.

11 Claims, 6 Drawing Sheets

FRAME CRACK DETECTION METHOD

TECHNICAL FIELD

The present disclosure relates generally to a detection method and, more particularly, to a method for detecting a crack in a machine frame.

BACKGROUND

Large machines such as, for example, wheel loaders, off-highway haul trucks, excavators, motor graders, and other types of earth-moving machines include frames to support their movement. Some of these frames are weld reparable (the frames are expected to crack during their economically useful life). Cracks in the frame are detected during regular inspections, and then repaired through welding. But, because of the size of the machines and/or the working environment of the machines, the frames can be difficult to inspect quickly and efficiently. In fact, it is not uncommon for a machine to be taken out of service for twenty-four hours while its frame is first completely cleaned, and then visually inspected for cracks. This problem can be exacerbated when parts of the frame are not easily accessible to maintenance crews. A frame that requires regular complete visual inspections can result in low productivity and efficiency. Also, potentially hazardous cracks may not be detected through a visual process. For example, a crack may form in a hidden side of a frame element. After an inspection, the crack may expand until it completely severs the frame element. When the frame element is severed, a portion of the machine may collapse, causing injury to an operator or nearby person, or extensive damage to the machine itself or a nearby machine or structure.

One way to reduce inspection time associated with crack detection is described in U.S. Pat. No. 4,721,413 (the '413 patent) issued to Crohas et al. on Jan. 26, 1988. The '413 patent describes a marine platform with a structure consisting of a lattice of tubular elements sealingly connected to one another. When a crack forms in one of the tubular elements, a fluid passes into and/or out of the tubular element. Some of the tubular elements are submerged, and have attached pickups. Each pickup is configured to detect the passage of fluid into and/or out of a tubular element. The interiors of multiple tubular elements may be connected to each other, thereby increasing the detection region of a pickup. When a pickup detects fluid passage, the pickup acoustically transmits a signal to a submerged intermediate transmission means, which wiredly transmits the signal to an unsubmerged signal acquisition unit. The signal contains information about where the pickup is located and what the pickup detected.

Although the pickups of the '413 patent may help detect cracks in a tubular structure, the pickups may do little to pinpoint the exact location of a crack. Furthermore, though the pickups of the '413 patent may communicate the general region of the crack to a signal acquisition unit, the signal acquisition unit may do little to assess the tolerability or criticality of the crack. In addition, though the pickups of the '413 patent may detect the existence of the crack during the time period between inspections, permanent installation of pickups may be prohibitively expensive for certain applications.

The disclosed method and system are directed to overcoming one or more of the problems set forth above.

SUMMARY

In one aspect, the present disclosure is directed to a method for detecting a crack in a frame. The method includes sensing with a first pressure sensor a first pressure within a first sealed cavity. The first sealed cavity is interior to a first structure of the frame. Additionally, the method includes detecting a first change in the sensed first pressure. The method also includes determining preliminarily that a crack has formed in the first structure based on the detected change in the sensed first pressure. In addition, the method includes determining a criticality of the crack.

In another aspect, the present disclosure is directed to a machine. The machine includes a frame. The frame includes a first sealed cavity. A first port is associated with the first sealed cavity. And, a first valve is configured to control communication of fluid to and from the first sealed cavity via the first port. The machine also includes a first pressure sensor. The first pressure sensor is associated with the first port to open the first valve. And, the first pressure sensor is configured to sense the pressure within the first sealed cavity and generate a corresponding first signal. Additionally, the machine includes a controller that is in communication with the first pressure sensor. The controller is configured to provide a first frame crack warning based on the first signal.

DETAILED DESCRIPTION

Figure 1:
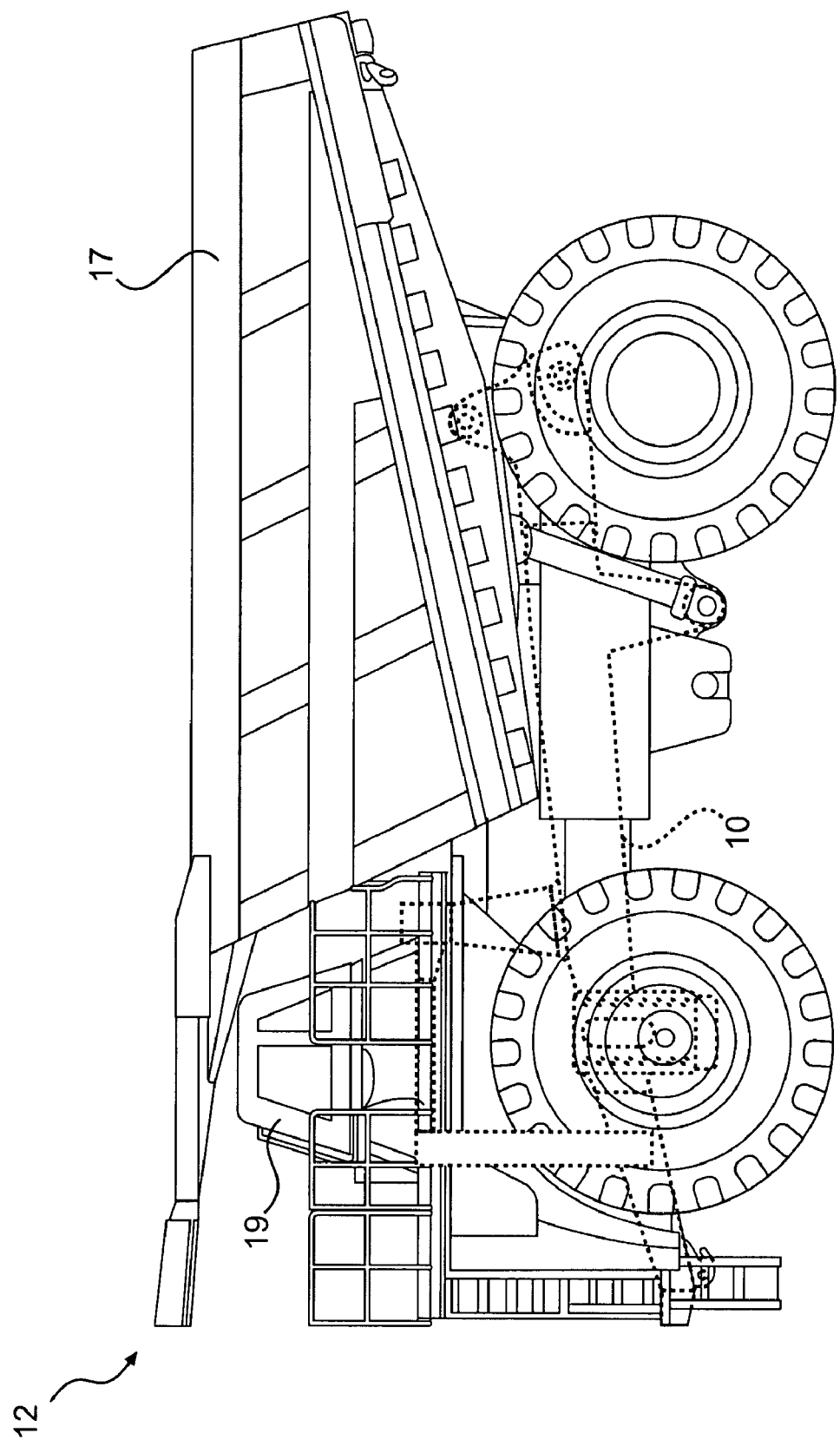
FIG. 1 is a pictorial illustration of an exemplary disclosed machine having an exemplary disclosed frame.

FIG. 1 illustrates an exemplary frame 10 for a machine 12. The machine 12 is depicted as an off-highway haul truck. But, it is contemplated that machine 12 may be, for example, a wheel loader, an excavator, a motor grader, or another type of machine.

Figure 2:
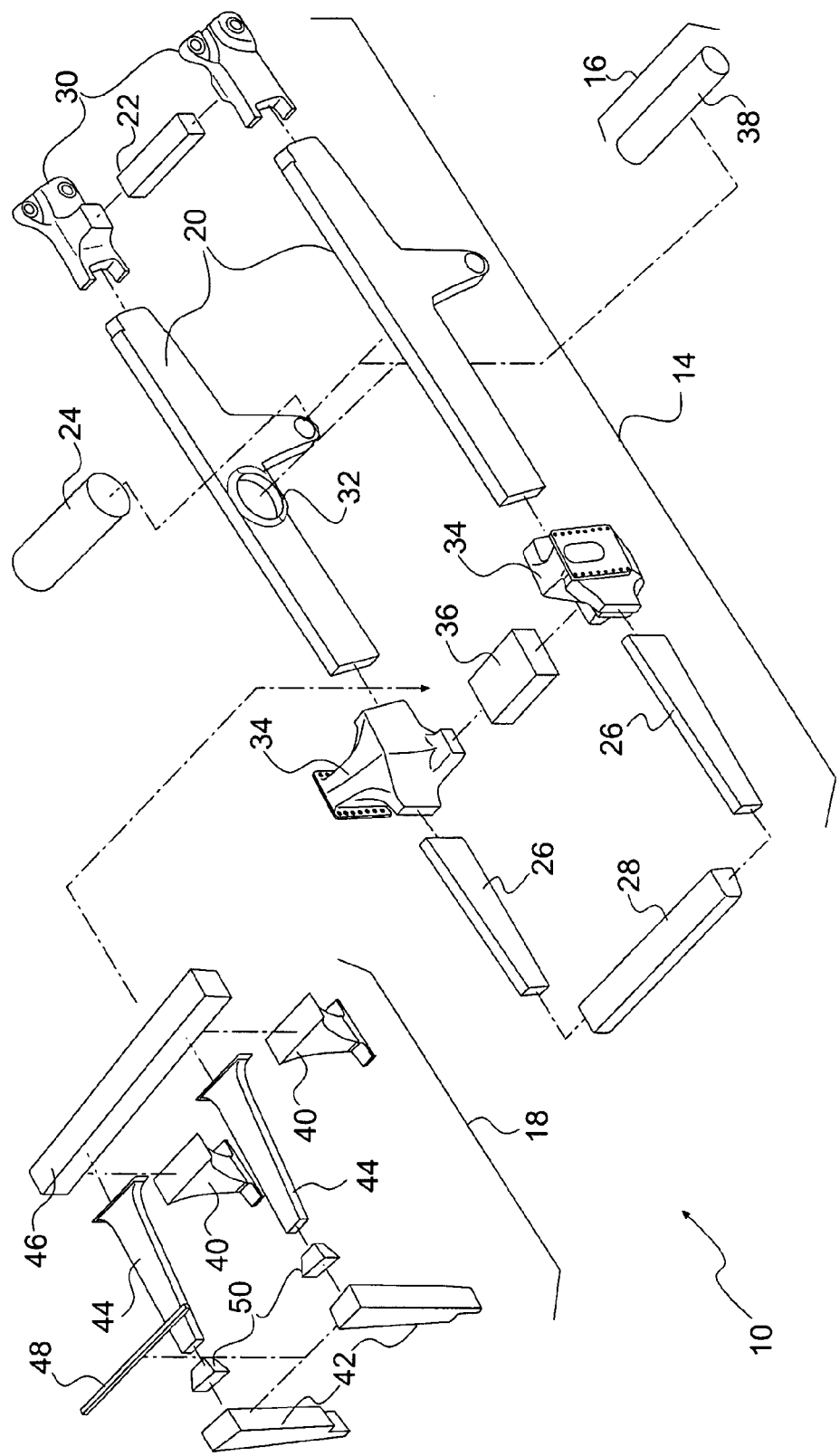
FIG. 2 is an exploded-view illustration of the frame of FIG. 1.

FIG. 2 illustrates an exploded-view of frame 10. Frame 10 may embody any structural unit that may support movement of machine 12. Frame 10 may be, for example, a stationary base frame connecting a power source to a traction device, a moveable frame member of a linkage system, or another frame known in the art.

Frame 10 may have one or more sub-assemblies. In particular, frame 10 may have a base sub-assembly 14, which supports and stabilizes other sub-assemblies. Frame 10 may also have a drop tube sub-assembly 16, which supports a work tool 17 (referring to FIG. 1), and a cab sub-assembly 18, which supports an operator station 19 (referring to FIG. 1). Each sub-assembly may include one or more box sections. Box sections may be, for example, beams having substantially hollow cross-sections. Box sections of frame 10 may be connected to each other via welding or in another way known in the art. Alternatively, box sections of frame 10 may be connected to each other via castings, thereby moving welds to lower stress areas. Castings of frame 10 may be, for example, fabricated from mild steel, and have large radii with internal reinforcing ribs to dissipate stress in areas of high stress concentration.

Base sub-assembly 14 may include two main rails 20, one rear support 22, one center tube 24, two front rails 26, and one bumper 28. The rearward end of each main rail 20 may be connected to the forward end of an associated tail casting 30, the tail casting 30 extending generally parallel to the main rail 20 toward the rear of machine 12. Each tail casting 30 may be connected to an outward end of rear support 22. Rear support 22 may thus connect the inward sides of each tail casting 30. Forward of rear support 22, a center tube support casting 32 may be connected to and extend inward from each main rail 20. Each center tube support casting 32 may be connected to one outward end of a center tube 24. Center tube 24 may thus connect the inward sides of each center tube support casting 32. Forward of center tube 24, the forward end of each main rail 20 may be connected to a main casting 34, the main casting 34 extending generally parallel to the main rail 20. Each main casting 34 may also be connected to an outward end of a steering box 36. Steering box 36 may thus connect the inward sides of each main casting 34.

Each main casting 34 may also be connected to one front rail 26, the forward end of the main casting 34 connecting to the rearward end of the associated front rail 26 and the front rail 26 extending generally parallel to the main casting 34 toward the front of machine 12. The forward end of both front rails 26 may connect to the rearward side of bumper 28. Bumper 28 may thus connect the forward ends of each front rail 26.

Drop tube sub-assembly 16 may be connected to the two main rails 20 of base sub-assembly 14. Drop tube sub-assembly 16 may include one drop tube 38 and/or another box member and/or casting necessary to support work tool 17 (referring to FIG. 1). Work tool 17 may embody, for example, a container, a bucket, a plow, a truss boom, or another work tool known in the art. And, it may be connected to drop tube sub-assembly 16 via hydraulic actuators, hinges, threaded fasteners, or other connection devices known in the art. Each end of drop tube 38 may connect to the inward side of one main rail 20, thereby connecting the two main rails 20. Drop tube 38 may be located gravitationally lower than and forward of rear support 22 and gravitationally lower than and rearward of center tube 24 when frame 10 is in an assembled upright position. Alternatively, drop tube 38 may be located forward of center tube 24.

Cab sub-assembly 18 may be connected to a top side (gravitationally upper side when frame 10 is in an upright assembled position) of base sub-assembly 14. Cab sub-assembly 18 may include the two main rails 20 of base sub-assembly 14, the two front rails 26 of base sub-assembly 14, two rear pedestals 40, two front pedestals 42, two fore-aft beams 44, a main beam 46, a front cross tube 48, two slip castings 50, and/or another box member and/or casting necessary to support operator station 19 (referring to FIG. 1). Cab sub-assembly 18 may be connected to the top side of base sub-assembly 14 at four points. At two of these points, the lower end of each rear pedestal 40 may connect to an upper side of an associated main rail 20. Rear pedestals 40 may be located forward of center tube 24 and drop tube 38, and rearward of main castings 34. At two other points, the lower end of each front pedestal 42 may be connected to the upper and outward sides of an associated front rail 26. Front pedestals 42 may be located forward of main castings 34, and rearward of bumper 28.

The upper end of both rear pedestals 40 may connect to the lower side of main beam 46. Main beam 46 may thus connect the upper ends of each rear pedestal 40. The forward side of main beam 46 may be connected to the rearward end of both fore-aft beams 44. Main beam 46 may thus connect the rearward ends of each fore-aft beam 44. Fore-aft beams 44 may extend forward from main beam 46 generally parallel to front rails 26. The forward end of each fore-aft beam 44 may connect to the rearward end of an associated slip casting 50, the slip casting 50 extending generally parallel to the fore-aft beam 44.

The forward end of each slip casting 50 may connect to the rearward side of one front pedestal 42, thereby completing a chain of connections (main rails 20 to rear pedestals 40, rear pedestals 40 to main beam 46, main beam 46 to fore-aft beams 44, fore-aft beams 44 to slip castings 50, slip castings 50 to front pedestals 42, and front pedestals 42 to front rails 26) to connect main rails 20 to front rails 26. Front pedestals 42 may be connected to each other by front cross tube 48. Each outward end of front cross tube 48 may connect to the inward side of one front pedestal 42. Front cross tube 48 may be located gravitationally upward (when frame 10 is in an upright assembled position) of front rails 26 and forward of slip castings 50.

Figure 3:
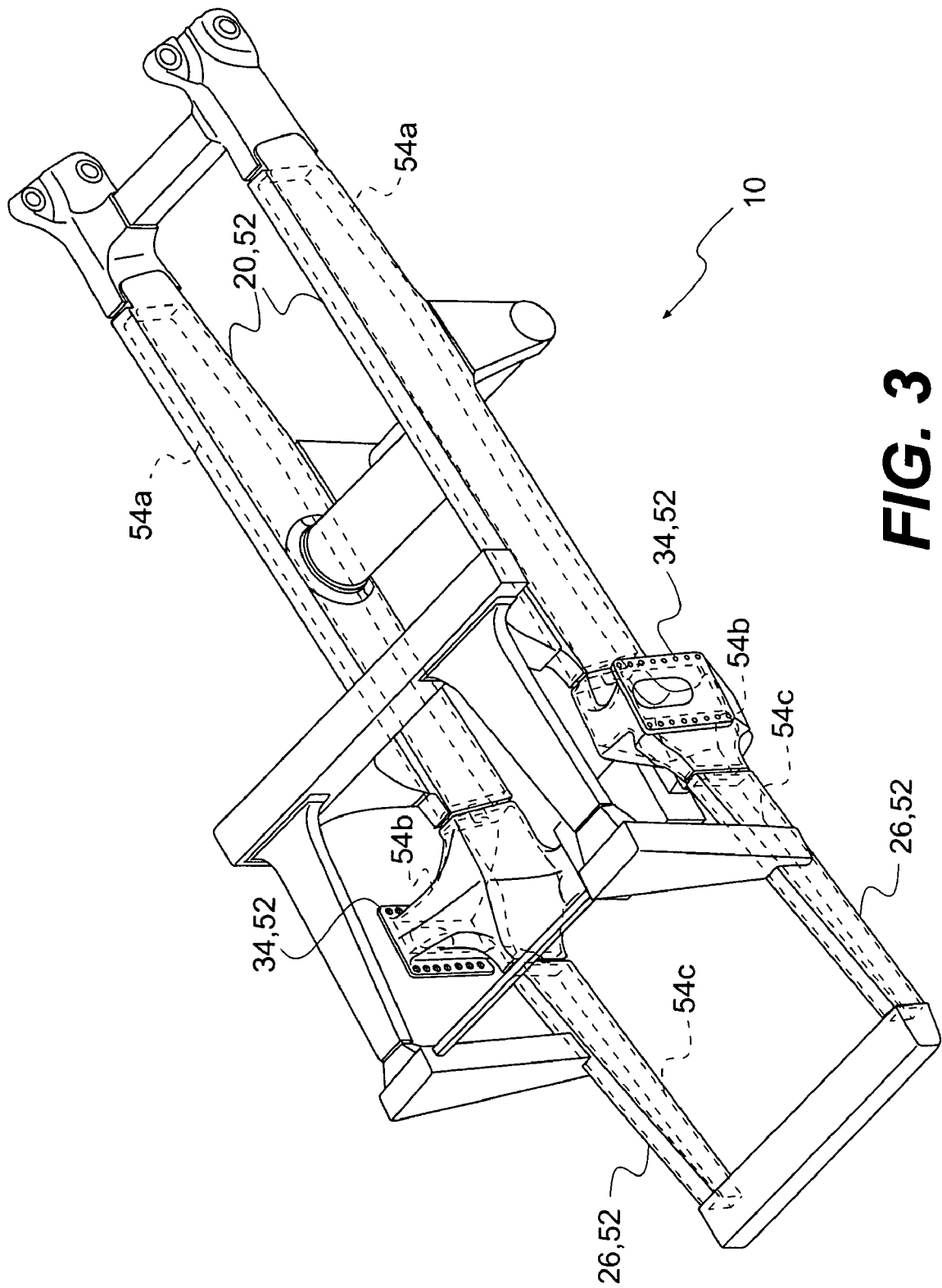
FIG. 3 is a pictorial illustration of exemplary sealed cavities interior to the frame of FIG. 1.
Figure 4:
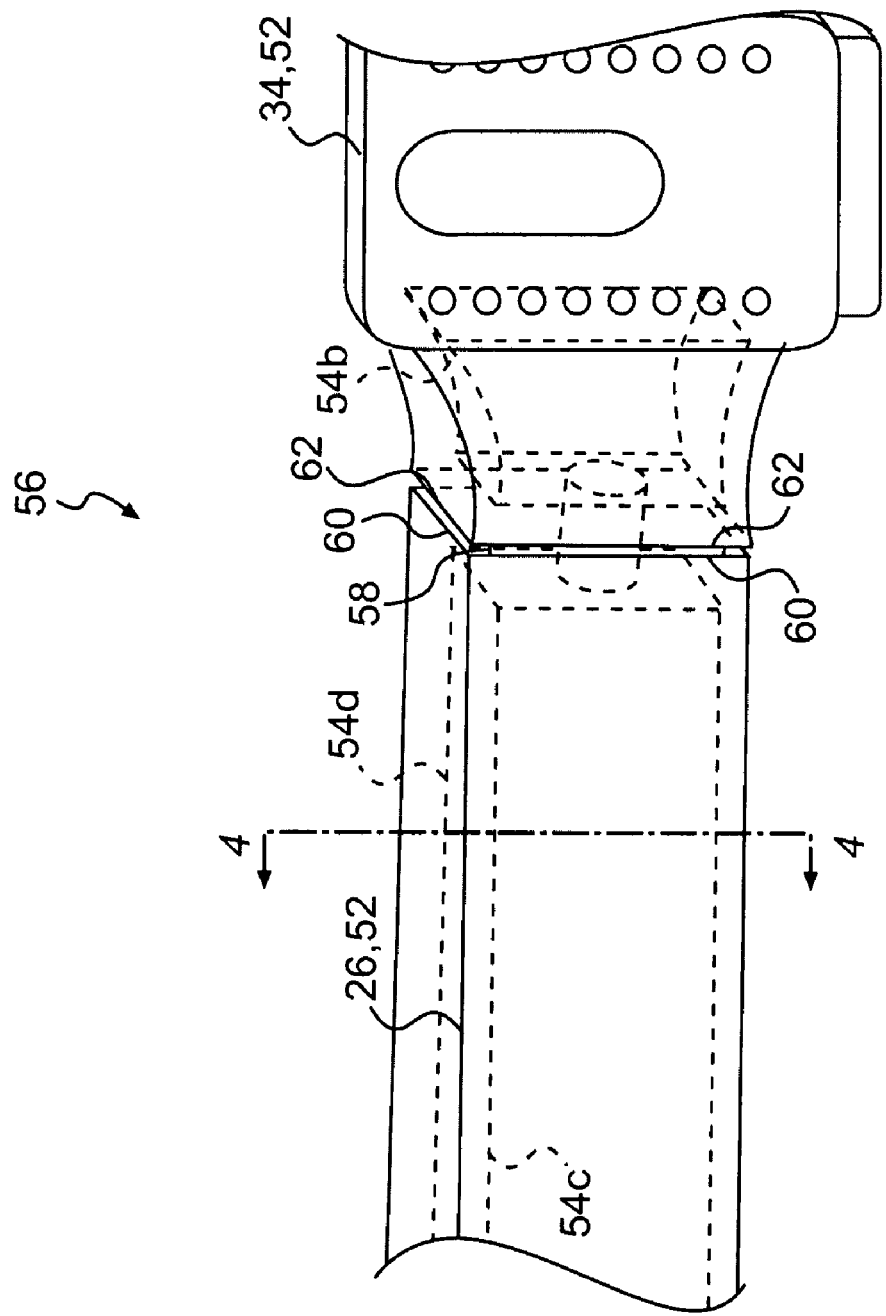
FIG. 4 is an enlarged pictorial illustration of an exemplary sealed cavity interior to the frame of FIG. 1.

FIG. 3 illustrates drop tube sub-assembly 16 and cab sub-assembly 18 assembled to base sub-assembly 14, thereby forming frame 10. Each box section and/or casting of frame 10 (hereafter "tubular frame element 52") may include a sealed cavity 54. For example, main rails 20 may include sealed cavities 54a, main castings 34 may include sealed cavities 54b, and front rails 26 may include sealed cavities 54c. It is contemplated that most, if not all, tubular frame elements 52 may include a sealed cavity 54. Alternatively, two or more connected tubular frame elements 52 (hereafter "region 56") may together have a single sealed cavity 54. As illustrated in FIG. 4, for example, front rail 26 and main casting 34 may be connected by a weld 58, which may wrap around the edges of a rearward end 60 of front rail 26 and the edges of a forward end 62 of main casting 34. A central bore 64 may pass through rearward end 60 and forward end 62, allowing fluid communication between sealed cavities 54b and 54c, thereby forming a larger sealed cavity 54d.

Figure 5:
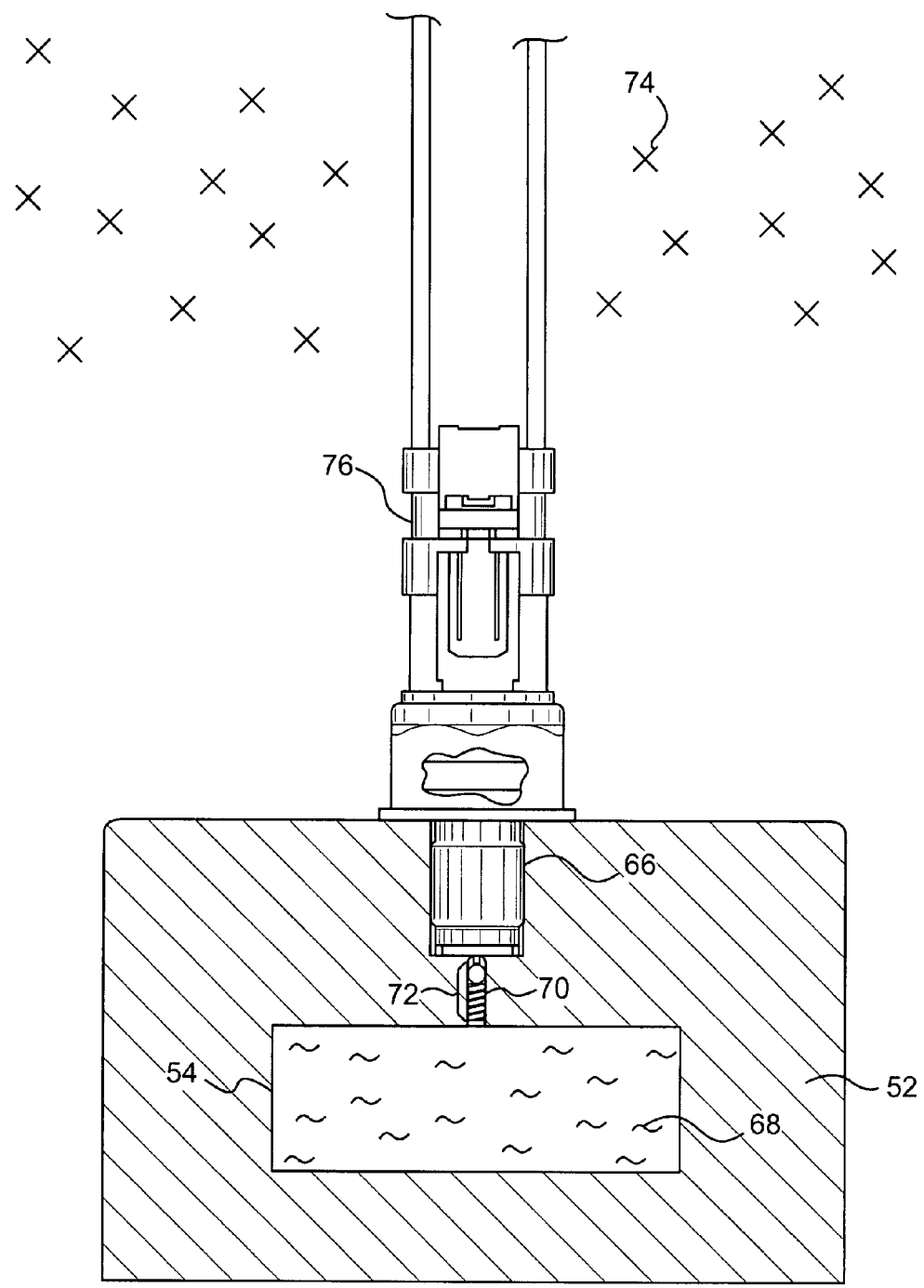
FIG. 5 is an enlarged cross-sectional illustration of an exemplary disclosed pressure sensor and port for use with the sealed cavity of FIG. 4.

FIG. 5 illustrates the cross section of a tubular frame element 52, which may be part of a region 56 (referring to FIG. 4), and which may include a sealed cavity 54. Sealed cavity 54 may be accessible via a port 66. Port 66 may be located on a surface of tubular frame element 52 that is easily accessible by maintenance personnel or other interested persons, and may allow intentional communication of a pressurized fluid 68 to and from sealed cavity 54. In particular, port 66 may include a central bore 70 in fluid communication with sealed cavity 54. A check valve 72 may be situated within central bore 70 to control the flow of fluid between central bore 70 and the atmosphere. Check valve 72 may normally be closed to inhibit the flow of fluid from central bore 70. Fluid 68 may be a gas such as, for example, nitrogen, helium, argon, air, or another gas known in the art. And, fluid 68 may be easily distinguishable from another fluid 74 situated exterior to tubular frame element 52. For example, fluid 68 may be, or may be dyed to be, a different color than fluid 74. The dye may be, for example, disperse red number 9 (1-methylaminoanthraquinone), yellow number 7 (1,9-benz-10-anthrone), or another dye that is a different color than fluid 74. It is contemplated that the dye may discolor tubular frame element 52. Alternatively, fluid 68 may be gaseous while fluid 74 is liquid. In yet another alternative, fluid 68 may be, or may be altered to be, detectable by olfactory means. An alteration may include, for example, adding an odorant detectable by persons and/or devices to fluid 68. This odorant may be, for example, mercaptan, or another odorant known in the art. A pressure sensor 76 may be associated with sealed cavity 54 to sense the pressure therein.

Pressure sensor 76 may be assembled to tubular frame element 52 via port 66. When assembled, pressure sensor 76 may open check valve 72, thereby providing fluid communication between pressure sensor 76 and sealed cavity 54. Pressure sensor 76 may conduct signals to and from a controller 78 (referring to FIG. 6). These signals may include the identity of pressure sensor 76; the current pressure within sealed cavity 54, as sensed by pressure sensor 76; the rate of change of the pressure within sealed cavity 54, as sensed by pressure sensor 76; and/or another signal representing desirable information regarding pressure sensor 76 or sealed cavity 54.

Figure 6:
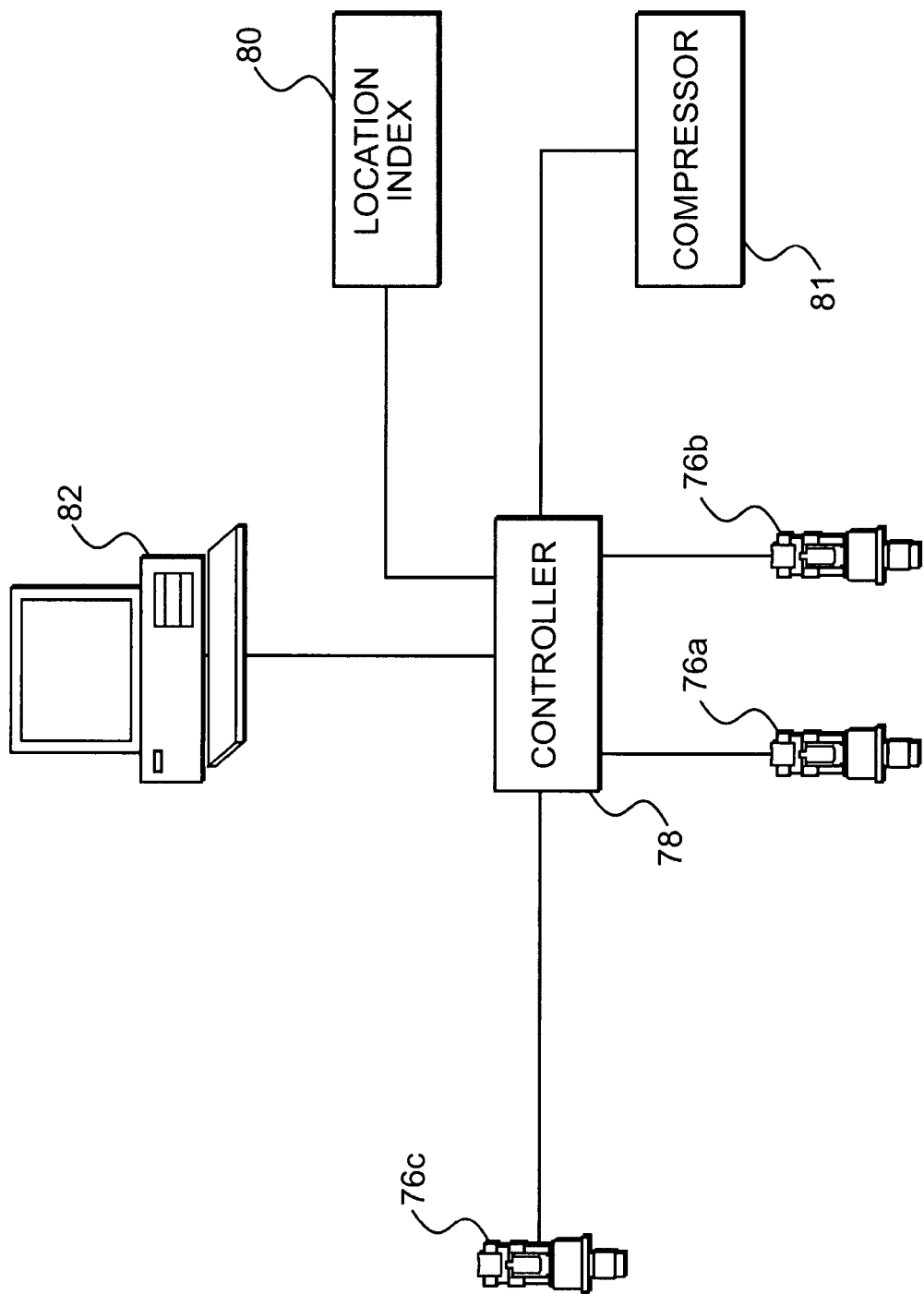
FIG. 6 is a diagrammatic illustration of an exemplary disclosed control system for use with the pressure sensor of FIG. 5.

Referring to FIG. 6, controller 78 may be associated with one or more pressure sensors 76 to gather information about frame 10. Controller 78 may include means for monitoring, recording, storing, indexing, processing, and/or communicating information. These means may include, for example, a memory, one or more data storage devices, a central processing unit, and/or another component that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 78 may be attached directly or indirectly to frame 10. Alternatively, controller 78 may be located in a hand held device. FIG. 6 illustrates possible communications pathways between controller 78 and other devices. In particular, controller 78 may communicate wiredly or wirelessly with one or more pressure sensors 76 and a location index 80 to determine the location, tolerability, and criticality of pressure changes within sealed cavities 54. Controller 78 may also communicate wiredly or wirelessly with a compressor 81 to repressurize sealed cavities 54, thereby allowing controller 78 to analyze additional pressure changes within sealed cavities 54. In addition, controller 78 may communicate wiredly or wirelessly with an operator interface device 82 to warn an operator or other interested person of pressure changes and, if necessary, schedule frame crack repairs.

Location index 80, electronic in form, may be stored in the memory of controller 78. Location index 80 may be updated by an operator or other interested person to reflect the locations of pressure sensors 76. Specifically, location index 80 may contain a unique identifier for each pressure sensor 76. This unique identifier may be associated with a location value representing a certain sealed cavity 54 interior to a certain tubular frame element 52 or region 56 (hereafter "structure 84"). The location value may be associated with a tolerability value and/or a criticality value.

The tolerability value may represent a minimum magnitude of a pressure change or a minimum rate of pressure change that signifies a potential crack, larger tolerability values representing poorly sealed cavities. For example, main casting 34 may have a very large tolerability value because it may be poorly sealed since it has a complex geometry and is joined to three other tubular frame elements 52. But, rear support 22 may have a very small tolerability value because it may be very well sealed since it has a simple geometry and is joined to only two other tubular frame elements 52.

The criticality value may represent the hazardousness of a crack in structure 84, larger criticality values representing more hazardous cracks (i.e. more urgently needed repair). For example, main rail 20 may have a very large criticality value since a crack in main rail 20 may lead to a collapse of work tool 17, causing injury to an operator or nearby person, or damage to a nearby machine or structure. But, front cross tube 48 may have a very small criticality value since a crack in front cross tube 48 may only lead to the discomfort of an operator.

As previously discussed, controller 78 may use compressor 81 to repressurize sealed cavity 54. In particular, compressor 81 may be fluidly connected to sealed cavity 54 to increase the pressure within sealed cavity 54 (by compressing air into sealed cavity 54) to a pressure greater than that of fluid 74. Compressor 81 may embody a fixed geometry compressor, a variable geometry compressor, or any other type of compressor known in the art.

Controller 78 may use operator interface device 82 to warn an operator or other interested person of the hazardous crack and schedule frame crack repairs. For example, operator interface device 82 may be a monitor, LCD screen, plasma screen, screen of a handheld device, warning lamp; alarm; horn; head-up display, offboard system, or another device operable to warn an operator or other interested person of pressure changes, and if necessary, schedule frame crack repairs. It is contemplated that controller 78 may also use operator interface device 82 to relay additional information about these pressure changes. For example, controller 78 may use operator interface device 82 to display the real-time pressure sensed by pressure sensor 76, the sealed cavity 54 associated with pressure sensor 76, the tolerability values associated with sealed cavity 54, the criticality value associated with sealed cavity 54, and/or other desirable information regarding pressure sensor 76 or sealed cavity 54.

INDUSTRIAL APPLICABILITY

The disclosed system may be applicable to any machine frame susceptible to cracking, for example, the frame of an off-highway haul truck. The system may detect information about the pressure within a sealed cavity of the frame, and report this information to interested persons. In particular, the disclosed system may detect when and where the frame cracks. Operation of the system will now be described.

The disclosed system may pressurize a sealed cavity of frame 10. Specifically, a filling device (not shown) may be connected to tubular frame element 52 via port 66. During connection, the filling device may open check valve 72, thereby providing fluid communication between the filling device and sealed cavity 54. The filling device may pressurize sealed cavity 54 with fluid 68 to a pressure greater than that of fluid 74. For example, the pressure difference between fluid 68 and fluid 74 may be greater than the minimum pressure change discernible by pressure sensor 76. The filling device may then be disconnected from tubular frame element 52, thereby closing check valve 72 to prevent fluid 68 from escaping sealed cavity 54 through port 66. It is contemplated that it may be advantageous to repressurize sealed cavity 54, possibly during machine 12 operation. For example, fluid 68 may slowly leak from sealed cavity 54 until the pressure difference between fluid 68 and fluid 74 is no longer greater than the minimum pressure change discernible by pressure sensor 76. Therefore, the disclosed system may automatically use compressor 81 to repressurize sealed cavity 54 so that a pressure change within sealed cavity 54 is again discernible by pressure sensor 76.

The disclosed system may also detect pressure changes within the sealed cavity. Prior to operation of machine 12, pressure sensor 76 may be assembled to tubular frame element 52 via port 66. As pressure sensor 76 is assembled, it may open check valve 72, thereby providing fluid communication between pressure sensor 76 and sealed cavity 54. Maintenance personnel or other persons may update location index 80 to reflect that pressure sensor 76 is in fluid communication with sealed cavity 54. Additionally, an operator or other interested person may update location index 80 to reflect the tolerability and criticality values of structure 84.

During operation of machine 12, controller 78 may communicate with pressure sensor 76 to determine the unique identifier of pressure sensor 76. Controller 78 may also communicate with location index 80 to determine, based on the unique identifier of pressure sensor 76, the sealed cavity 54 with which pressure sensor 76 is in fluid communication. Additionally, controller 78 may communicate with location index 80 to determine, based on the unique identifier of pressure sensor 76, the structure 84 exterior to sealed cavity 54.

Having determined pressure sensor 76 is in fluid communication with sealed cavity 54 interior to structure 84, controller 78 may further communicate with location index 80 to determine the tolerability and criticality values of sealed cavity 54. Controller 78 may compare the tolerability value (representing a minimum magnitude or rate of pressure change signifying a potential crack) to a detected pressure change. The detected pressure change may be of the same type as the tolerability value (i.e. a tolerability value representing a magnitude may be compared to a detected pressure change representing a magnitude and a tolerability value representing a rate may be compared to a detected pressure change representing a rate).

When the detected pressure change is greater than the tolerability value, controller 78 may preliminarily determine that the pressure change is the result of a crack in structure 84 (i.e. controller 78 may preliminarily detect a crack in structure 84). But, when the pressure change and tolerability value each represent magnitudes (as opposed to rates) the preliminary determination may be a false positive. For example, a slow leak (possibly the result of sealed cavity 54 being poorly sealed) may, after sufficient time, lead to a pressure change greater in magnitude than the tolerability value. But, this pressure change may not represent a crack. Therefore, controller 78 may double check the structure 84 crack detection. Soon (within a few minutes) after using compressor 81 to repressurize sealed cavity 54, controller 78 may again compare the tolerability value to another pressure change detected by pressure sensor 76. When this pressure change is again greater than the tolerability value, controller 78 may confirm the preliminary structure 84 crack detection. Otherwise, controller 78 may determine the preliminary structure 84 crack detection is a false positive and disregard it.

Having determined that there is a crack in structure 84, when the criticality value for structure 84 is sufficiently large (i.e. the crack is hazardous), the disclosed system may warn an operator or other interested person of the crack and, if necessary, schedule frame crack repairs. Specifically, controller 78 may use an operator interface device 82 to warn an operator or other interested person of the crack in structure 84 and, if necessary, automatically interface with a repair database (not shown) to schedule frame crack repairs. Additionally, controller 78 may use operator interface device 82 to notify the operator or other interested person of what triggered the structure 84 crack detection. In particular, operator interface device 82 may be used to display the real-time and/or historical pressures sensed by pressure sensor 76, and the tolerability and criticality values associated with structure 84.

The disclosed system may also be used to locate the exact position of a crack. In particular, escaping fluid 68 may be detectable by maintenance personnel or other interested persons because it is visibly and/or olfactorily distinguishable from fluid 74. It is contemplated that the pressure of fluid 68 may equalize with that of fluid 74 before maintenance personnel or other interested persons may inspect structure 84. When this occurs, sealed cavity 54 may be repressurized (using the filling device or compressor 81). Once repressurized, fluid 68 may again escape from sealed cavity 54, and be detectable by maintenance personnel or other interested persons. Alternatively, escaping fluid 68 may discolor structure 84 in the exact position of a crack. The discoloration may remain visible to maintenance personnel or other interested persons after the pressure of fluid 68 has equalized with that of fluid 74.

The disclosed system may be operated continuously without needlessly distracting an operator. When operated continuously, it is contemplated that controller 78 may be connected directly or indirectly to frame 10. Controller 78 may periodically communicate with one or more pressure sensors 76 to determine when the pressure within individual sealed cavities 54 changes. When this pressure changes, controller 78 may automatically use operator interface device 82 to warn an operator or other interested person of a hazardous crack, based on a preliminary or confirmed structure 84 crack detection, and a sufficiently large structure 84 criticality value. The operator or other interested person may then appropriately handle the situation. For example, the operator or other interested person may proceed to a maintenance facility, call a maintenance team, or act in another way known in the art. Additionally, controller 78 may automatically use operator interface device 82 to schedule frame crack repairs. It is contemplated that preliminary and/or confirmed structure 84 crack detections with insufficiently large structure 84 criticality values (i.e. detected structure 84 cracks that are not hazardous) may be of little concern to the operator. Therefore, controller 78 may store information regarding these detections. The detections may then be handled by maintenance personnel or other interested persons during routine inspections and/or at other more convenient times.

The disclosed system may alternatively be operated only during routine inspections. When operated during routine inspections, pressure sensors 76 and controllers 78 may be shared between more than one frame 10, thereby reducing total equipment costs. In particular, a routine inspection may begin with one or more sealed cavities 54 being pressurized with fluid 68. A pressure sensor 76 may then be assembled to each structure 84. It is contemplated that controller 78 and operator interface device 82 may be integral components within a handheld device. Controller 78 may periodically communicate with one or more pressure sensors 76 over a fixed period of time to determine when the pressure within individual sealed cavities 54 changes. When the pressure changes, controller 78 may automatically use operator interface device 82 to warn maintenance personnel or other interested persons of a hazardous crack, based on a preliminary or confirmed structure 84 crack detection. Maintenance personnel or other interested persons may then appropriately handle the situation. For example, a hazardous crack may be immediately repaired. But, a non-hazardous crack may be scheduled for repair on a later date. After the fixed period of time has elapsed, pressure sensors 76 may be disassembled from their associated structures 84. Sealed cavities 54 may then be depressurized through their ports 66. It is contemplated that maintenance personnel or other interested persons may have fewer pressure sensors 76 than there are sealed cavities 54 in frame 10. Therefore, the maintenance personnel or other interested persons may repeat the above process as necessary until a pressure sensor 76 has been assembled to and disassembled from each structure 84 of frame 10.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method of detecting and responding to a crack in a vehicle frame, the vehicle frame having a plurality of structures with sealed interior cavities, comprising:
   providing a tolerability value and a criticality value for each of the sealed cavities;
   sensing a first pressure within a first sealed cavity interior to a first structure of the frame;
   detecting a first change in the sensed first pressure;
   determining that a crack has formed in the first structure based on the detected first change exceeding the tolerability value; and
   providing a response based upon the criticality value and a determination that the tolerability value was exceeded.

2. The method of claim 1, further including:
   after it has been determined that the tolerability value has been exceeded, confirming the presence of a crack by re-pressurizing the first sealed cavity;
   detecting a second change in the sensed first pressure; and
   determining that the crack has formed in the first structure based on the detected second change in the first pressure.

3. The method of claim 1, further including determining a location of the crack.

4. The method of claim 1, wherein the criticality values are based on the location of the sealed cavities.

5. The method of claim 1, wherein the response includes providing a frame crack warning to a vehicle operator.

6. A machine, comprising:
   a frame;
   a plurality of traction devices operatively connected to the frame;
   a plurality of sealed cavities disposed within the frame;
   a tolerability value and a criticality value associated with each of the sealed cavities;
   a pressure sensor associated each sealed cavity;
   a controller in communication with the pressure sensors, the controller configured to determine whether a change in a first sensed pressure exceeds the tolerability value, and, if the tolerability value has been exceeded, to generate a response based upon the criticality value.

7. The machine of claim 6, further comprising a filling device fluidly connected to the sealed cavities, the controller further configured to provide a re-pressurizing signal to the filling device in response to the first sensed pressure exceeding the tolerability value, the controller further configured to determine whether a change in a second sensed pressure exceeds the tolerability value to confirm the presence of a crack.

8. The machine of claim 6, wherein the criticality values are based upon the location of the sealed cavities.

9. The machine of claim 6, wherein the machine further includes an operator station having a display, wherein the response includes a warning signal provided by the display.

10. The machine of claim 9, wherein the response further includes an indication of a location of a detected pressure loss.

11. The machine of claim 6, wherein the tolerability value is based on a minimum magnitude of a pressure change.

* * * * *